(12) United States Patent
Kim

(10) Patent No.: US 6,920,040 B2
(45) Date of Patent: Jul. 19, 2005

(54) COMPUTER SYSTEM HAVING A MAIN CASING WITH A MOVABLE PORT

(75) Inventor: Hyeng-kyun Kim, Seoul (KR)

(73) Assignee: Samsung Electronics Co., LTD, Suwon-si (KR)

( * ) Notice: Subject to any disclaimer, the term of this patent is extended or adjusted under 35 U.S.C. 154(b) by 5 days.

(21) Appl. No.: 10/373,740

(22) Filed: Feb. 27, 2003

(65) Prior Publication Data

US 2004/0008480 A1 Jan. 15, 2004

(30) Foreign Application Priority Data

Jul. 10, 2002 (KR) .......................................... 2002-40095

(51) Int. Cl.[7] .................................................. G06F 1/16
(52) U.S. Cl. ....................................... 361/683; 361/686
(58) Field of Search .............................. 361/683, 686, 361/724–727; 312/223.1–223.3

(56) References Cited

U.S. PATENT DOCUMENTS 5,163,833 A  * 11/1992  Olsen et al. ................... 439/61
5,336,099 A  *  8/1994  Aldous et al. ............... 439/131
6,125,031 A     9/2000  Della Fiora et al.
6,290,517 B1 *  9/2001  Anderson .................... 439/131

FOREIGN PATENT DOCUMENTS

| CN | 2492874    | 5/2002  |
|----|------------|---------|
| JP | 7-244541   | 9/1995  |
| KR | 1998-35244 | 8/1998  |
| KR | 1998-66294 | 10/1998 |
| KR | 189577     | 5/2000  |
| KR | 2001-25412 | 4/2001  |
| KR | 239097     | 7/2001  |

OTHER PUBLICATIONS

Office Action Issued from SIPO dated Nov. 12, 2004, citing the above–listed reference.

* cited by examiner

Primary Examiner—Yean-Hsi Chang
(74) Attorney, Agent, or Firm—Staas & Halsey LLP

(57) ABSTRACT

A computer system comprises a main casing, a guide part shaped like an elongated hole and formed along an up and down direction on the main casing, and a port unit slidingly engaging the guide part. The port unit has at least one port to which an external device can be connected. With this configuration, a computer system has a port unit with a port that can slide up and down in the main casing of the computer, so that a position of the port can be changed as desired.

17 Claims, 5 Drawing Sheets

COMPUTER SYSTEM HAVING A MAIN CASING WITH A MOVABLE PORT

CROSS-REFERENCE TO RELATED APPLICATIONS

This application claims the benefit of Korean Application No. 2002-40095 filed Jul. 10, 2002, in the Korean Intellectual Property Office, the disclosure of which is incorporated herein by reference.

BACKGROUND OF THE INVENTION

1. Field of the Invention

The present invention relates to a computer system, and more particularly, to a computer system in which a front port unit can slide up and down on a main body casing of the computer system (i.e., of a main computer cabinet).

2. Description of the Related Art

Generally, a computer system comprises a main body including a main casing accommodating and supporting hardware components, such as a CPU (central processing unit), etc., an input device connected to the main body and through which data is inputted, and an output device connected to the main body and through which data inputted from the input unit is outputted as a picture, etc.

The main body can be classified into a desktop type in which a width of the main body is longer than its height, and a tower type in which a width of the main body is shorter than its height. Hereinafter, a computer system equipped with a tower type main body will be described by way of example.

As shown in FIG. 1, a conventional computer system comprises a main body 100 including a main casing 110, a front cover 130 covering the front of the main casing 110, a main cover 120 covering the upper and side parts of the main casing 110; an input device (not shown), such as a keyboard, a mouse, etc., connected to the main body 100 and through which data is inputted; and an output device (not shown), such as a monitor, for receiving the data from the main body 100 and displaying a picture (an image).

The main casing 110 includes a front panel 111 formed with a plurality of drive trays 112 receiving hardware components, such as a CD-ROM (compact disc—read only memory) drive, etc., a rear panel 113 formed with a plurality of slots 114 through which ports (not shown) of the hardware components (not shown) received in the drive trays 112 as well as other hardware components, such as a sound card, a modem card, etc, installed in the main body 110 are connected to connectors (not shown) of external devices (not shown), and a supporting frame 115 disposed between the front and rear panels 111 and 113 and forming a bottom and one side wall of the main casing 110.

In particular, through the slots 114 of the rear panel 113, the ports of the hardware components, such as a sound card, a modem card, etc., are exposed to the outside so as to be connected to the connectors of the external devices. Thus, the connectors of the external devices are connected to the ports of the hardware components, so that an electric signal is transmitted between the hardware components and the external devices.

On the other hand, among the ports provided in the rear panel 113, ports 140 can be provided in the front panel 111 (hereinafter referred to as "front ports"). The front ports 140 accommodate connection of connectors of the external devices, such as an ear phone, a mouse, etc., that are frequently connected and disconnected. Further, the front cover 130 is formed with a front port exposure hole 133 in correspondence to the front ports 140, so that the front ports 140 are exposed to the outside of the main body 100 through the front port exposure hole 133. Thus, the front ports 140 are convenient for a user to connect the connectors of the external devices to the main body 100 and to disconnect them therefrom.

Herein, FIG. 1 illustrates the front port 140 disposed in a front lower part of the main body 100, but the front port may be disposed in a front upper part or a front middle part of the main body 100.

However, in the conventional computer system, if the main body 100 which has the front port 140 disposed in the front lower part thereof is placed under a desk, a user has to bend down to connect a connector of an external device to one of the front ports 140 and to disconnect it therefrom, so that it is inconvenient for the user.

In contrast, if the main body 100, which has the front ports 140 disposed in a front upper part or a front middle part thereof, is placed on the desk, a cable of the external device hangs down in front of the main body 100, thereby deteriorating outer appearance of the main body 100 and inconveniencing the user.

SUMMARY OF THE INVENTION

Accordingly, it is an object of the present invention to provide a computer system in which a position of a port unit provided in a main body of the computer system and exposed to the outside can be changed as desired.

Additional objects and advantages of the invention will be set forth in part in the description which follows and, in part, will be obvious from the description, or may be learned by practice of the invention.

The foregoing and other objects of the present invention are achieved by providing a computer system comprising a main casing; a guide part shaped like an elongated hole and formed along an up and down direction in the main casing; and a front port unit provided with a front port to which an external device is connected and sliding along the guide part.

According to an aspect of the present invention, the front port unit comprises a front sliding part facing an outer surface of the main casing; a rear sliding part facing an inner surface of the main casing; and a connection part connecting the front sliding part and the rear sliding part.

According to an aspect of the present invention, the guide part and the front port unit are provided on the front of the main casing.

According to an aspect of the present invention, the computer system further comprises a front cover coupled/attached to the front of the main casing and formed with a front port exposure hole exposing the front port to the outside.

According to an aspect of the present invention, the front port exposure hole comprises an upper exposure hole provided in an upper part of the front cover, and a lower exposure hole provided in a lower part of the front cover.

According to an aspect of the present invention, the front port exposure hole is shaped like an elongated hole and provided along a sliding direction of the front port unit.

According to an aspect of the present invention, the computer system further comprises at least one exposure hole cover detachably coupled/attached to the front cover and partially covering the front port exposure hole.

According to an aspect of the present invention, the computer system further comprises a friction member interposed between the main casing and the front port unit, and controlling sliding of the front port unit.

According to an aspect of the present invention, the friction member comprises a flat spring.

According to an aspect of the present invention, the front port unit comprises a cable through hole through which a cable from the front part passes to the inside of the main casing.

BRIEF DESCRIPTION OF THE DRAWINGS

These and other objects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
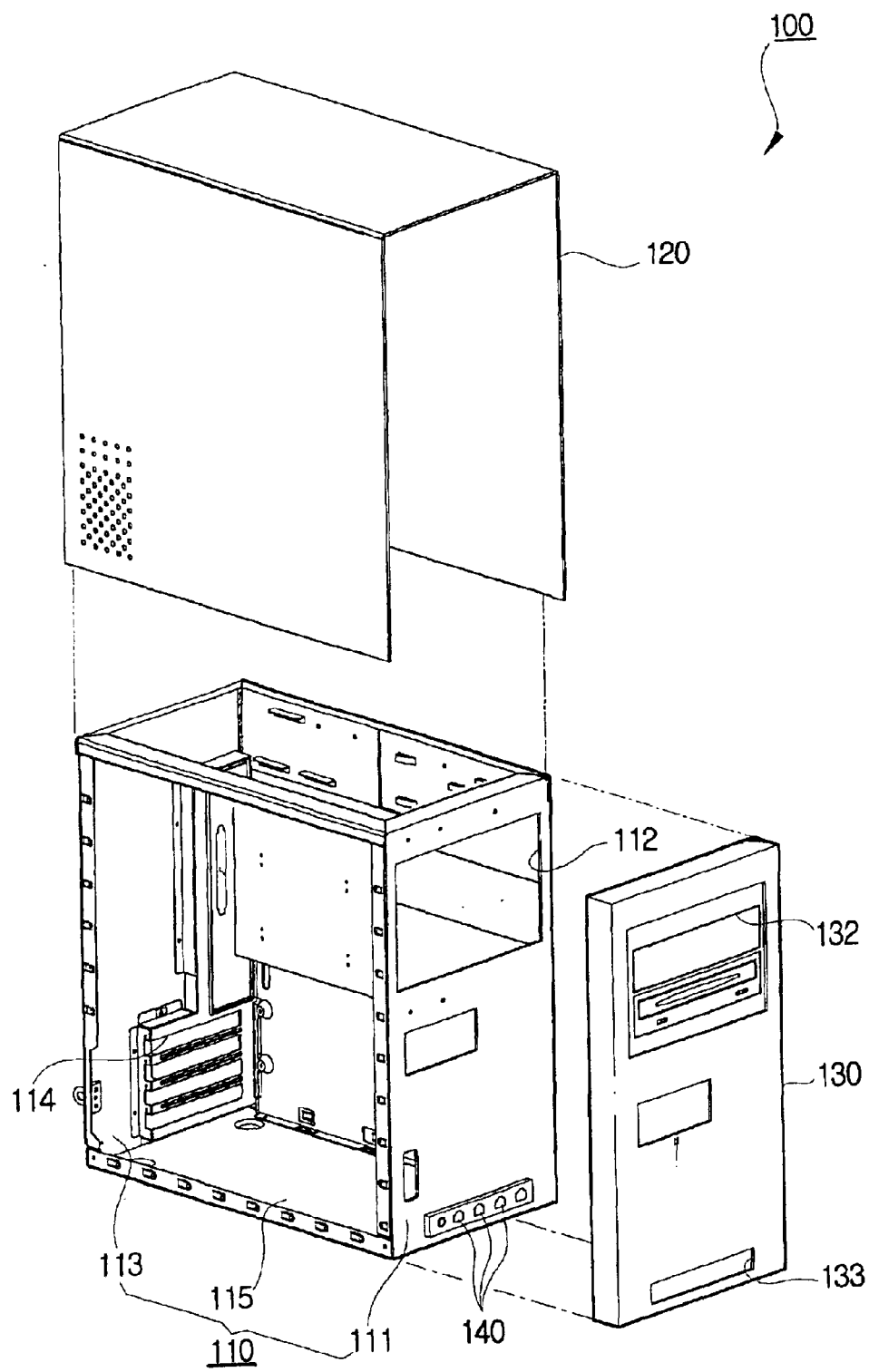
FIG. 1 is an exploded perspective view of a main body of a conventional computer system.

Reference will now be made in detail to the present embodiments of the present invention, examples of which are illustrated in the accompanying drawings, wherein like reference numerals refer to the like elements throughout.

Figure 2:
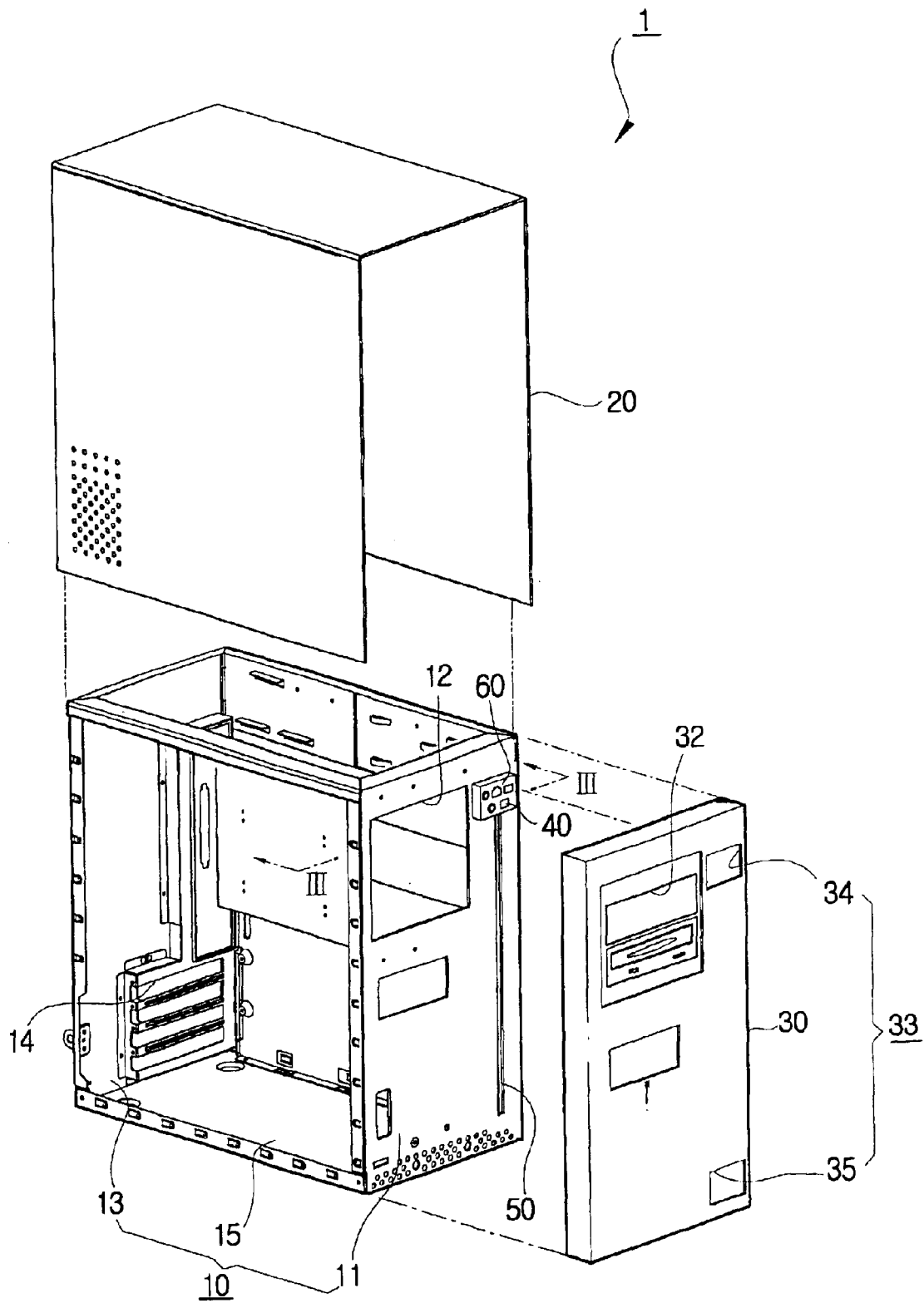
FIG. 2 is an exploded perspective view of a main body of a computer system according to a first embodiment of the present invention.

As shown in FIG. 2, a computer system according to the present invention comprises a main body 1 comprising a main casing 10, a front cover 30 covering a front of the main casing 10, a main cover 20 covering upper and side parts of the main casing 10; an input device (not shown), such as a keyboard, a mouse, etc., connected to the main body 1 and through which data is inputted; and an output device (not shown), such as a monitor, receiving the data from the main body 1 and displaying a picture.

Typically, the main casing 10 comprises a front panel 11 formed with a plurality of drive trays 12 receiving hardware components, such as a CD-ROM drive, etc., a rear panel 13 formed with a plurality of slots 14 through which ports (not shown) of the hardware components (not shown) in the drive trays 12 as well as other hardware components, such as a sound card, a modem card, etc., are connected to connectors (not shown) of external devices (not shown), and a supporting frame 15 disposed between the front and rear panels 11 and 13 and forming a bottom and one side wall of the main casing 10.

The front panel 11 is formed with a guide part 50 shaped like an elongated hole. The guide part 50 is slidingly engaged with a front port unit 60, which comprises a plurality of front ports (i.e., interfaces) 40 through which the external devices, such as an ear phone, a microphone, a communication cable, etc., can be electrically connected to the hardware components, such as the sound card, the modem card, etc. Therefore, the front port unit 60 comprising the plurality of front ports 40 slides up and down (i.e., is movable) in the main body 1 along a sliding direction of the guide part 50.

Figure 3:
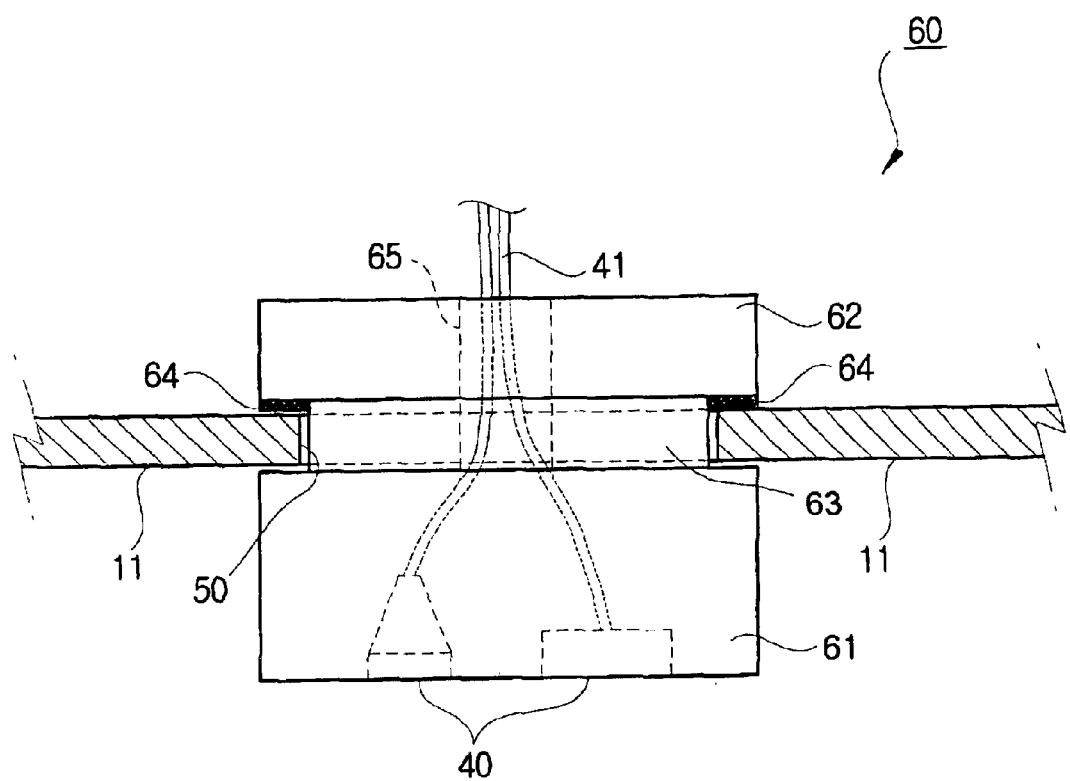
FIG. 3 is a sectional view along line III—III of a front port unit in the computer system shown in FIG. 2, according to an embodiment of the first invention.
Figure 4:
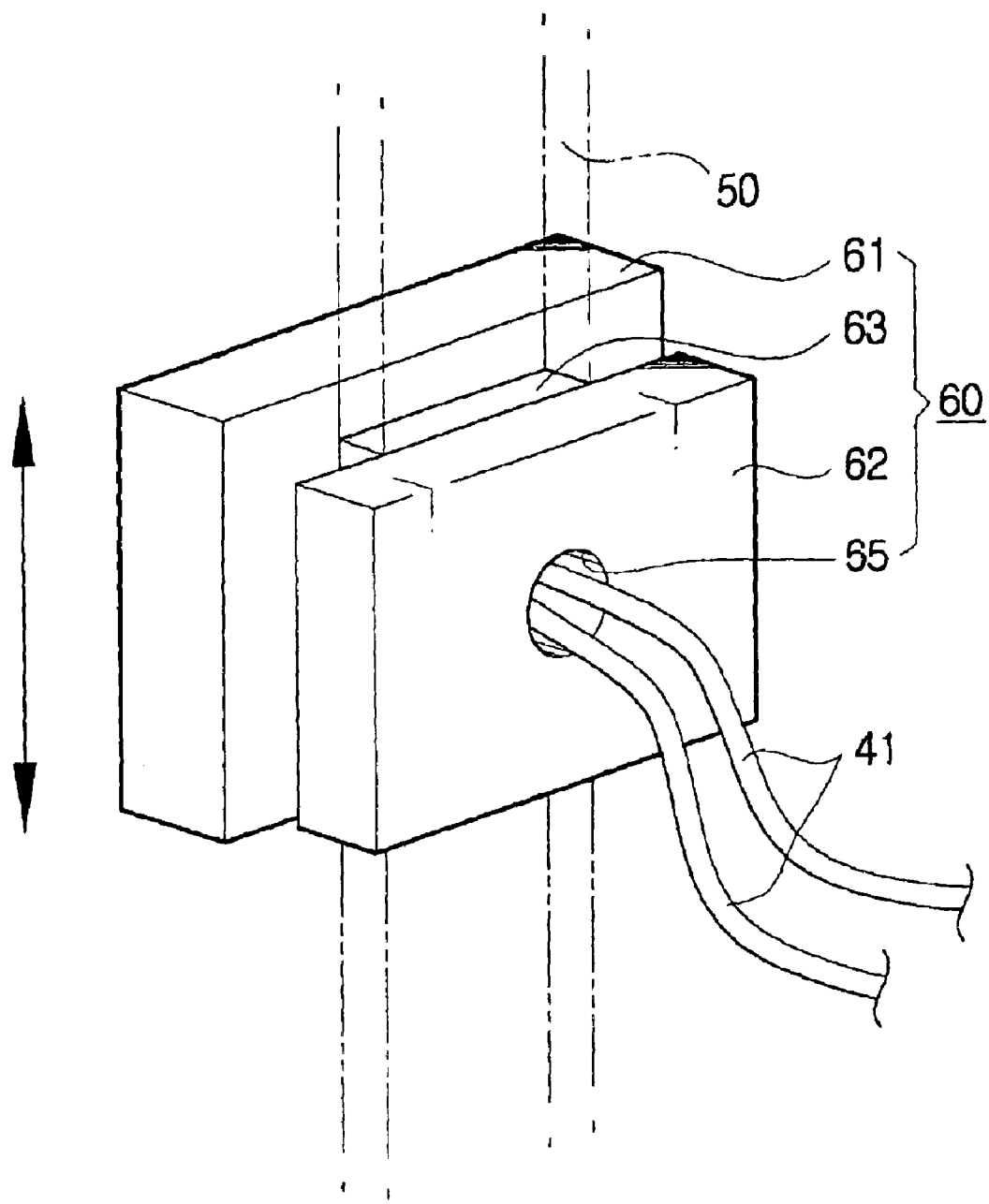
FIG. 4 is a perspective view of the front port unit shown in FIG. 3.

As shown in FIGS. 3 and 4, the front port unit 60 comprises a front sliding part 61 facing an outer surface of the front panel 11, a rear sliding part 62 facing an inner surface of the front panel 11. Further, the front port unit 60 comprises a connection part 63 combining the front sliding part 61 with the rear sliding part 62, the connection part 63 passing through the guide part 50.

The front sliding part 61 has a front surface provided with the plurality of front ports 40 exposed to the outside of the main casing 10, and a rear surface facing the outer surface of the front panel 11 adjacent to the guide part 50. Further, the rear sliding part 62 faces the inner surface of the front panel 11 adjacent to the guide part 50. Herein, the front and rear sliding parts 61 and 62 are larger than the guide part 50 in width, so that the front and rear sliding parts 61 and 62 are prevented from breaking away (i.e., disengaging) from the guide part 50 of the main casing 10.

The connection part 63 has a front part coupled to the front sliding part 61, and a rear part coupled to the rear sliding part 62. Thus, the connection part 63 passes through the guide part 50 and couples the front and real sliding parts 61 and 62, respectively, allowing the front port unit 60 to slide up and down along the guide part 50.

According to an aspect of the present invention, the front port unit 60 comprises a cable through hole 65 which is formed throughout the front sliding part 61, the rear sliding part 62, and the connection part 63, through which front port cables 41 pass through to electrically connect the front ports 40 to the hardware components, such as the sound card, etc., accommodated in the main body 1. Thus, the front port cables 41 come out of the front ports 40 toward the inside of the main casing 10 through the cable through hole 65, thereby preventing damage to a junction between the front ports 40 and the front port cable 41 by reducing stress on the junction. Of course, the present invention is not limited to the cable through hole 65 as a junction protector, but other junction protectors can be provided to protect, during sliding of the front port unit 60, a junction between the front ports 40 and the port cables extending from the front ports 40 towards inside of the main casing 10.

According to an aspect of the present invention, the main casing 10 and the front port unit 60 is provided a friction member 64 that controls sliding of the front port unit 60. FIG. 3 illustrates the friction member 64 interposed between the front panel 11 and the rear sliding part 62, but the friction member 64 may be interposed between the front panel 11 and the front sliding part 61 or between the connection part 63 and the guide part 50 of the front panel 11. Thus, the friction member 64 not only prevents the front port unit 60 from arbitrarily (freely) sliding within or along the guide part 50, but can also stop (allow positioning of) the front port unit 60 at a predetermined position on the front panel 11, as desired.

According to an aspect of the present invention, the friction member 64 comprises a flat spring. That is, the flat spring elastically presses the front panel 11 against the front port unit 60, thereby preventing the front port unit 60 from arbitrarily sliding along the guide part 50.

According to the first embodiment of the present invention, the front cover 30, which is combined (attached/coupled) to the front of the main casing 10 and forms an outer appearance for the main body 1, is formed with a drive exposure hole 32 through which the hardware components installed on the drive tray 12 of the front panel 11 are exposed to the outside of the main body 1, and is formed with a front port exposure hole unit 33 through which the front ports 40 of the front port unit 60 can be exposed to the outside of the main body 1.

The front port exposure hole unit 33 comprises an upper exposure hole 34 exposing the front port unit 60 to the outside when the front port unit 60 is disposed at an upper part of the main casing 10, and a lower exposure hole 35 exposing the front port unit 60 to the outside when the front port unit 60 is disposed at a lower part of the main casing 10. Thus, when the main body 1 is placed under a desk (not shown), the front port unit 60 can be moved up to the upper part of the main casing 10 so as to be exposed to the outside through the upper exposure hole 34, and so that a user can connect a connector of an external device to one of the front ports 40 and disconnect the connector therefrom without bending down as far as if the front ports 40 were positioned at a lower part of the main casing 10. In contrast, when the main body 1 is placed on top of the desk (not shown), the front port unit 60 can be moved down to the lower part of the main casing 10, so that a cable (not shown) of the external device does not hang down in front of the main body 1.

Figure 5:
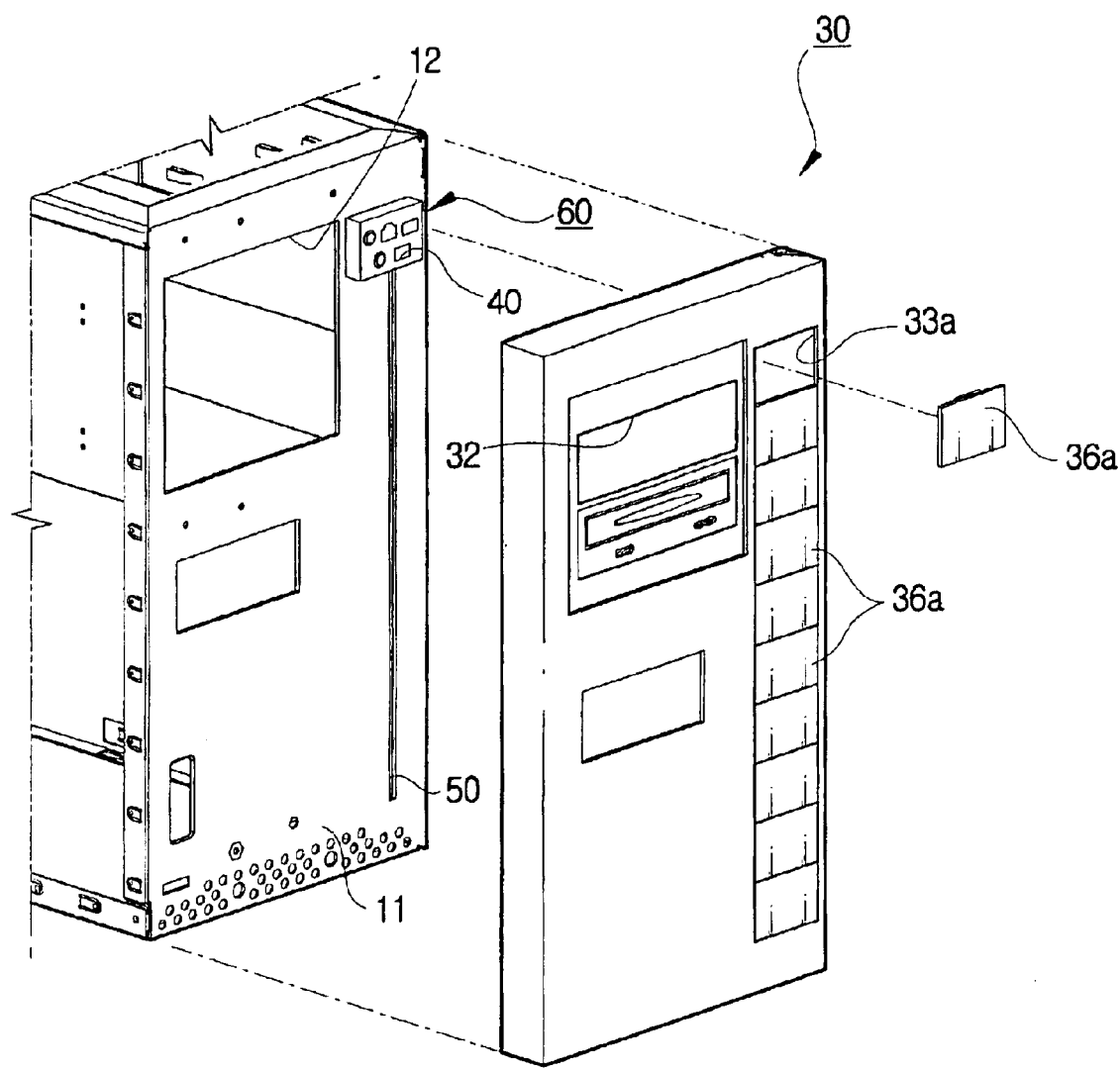
FIG. 5 is a perspective view of a main body of a computer system according to a second embodiment of the present invention.

According to a second embodiment of the present invention, a front cover 30 is, as shown in FIG. 5, formed with a front port exposure hole 33a shaped like an elongated hole and provided along a sliding direction of the front port unit 60. That is, the front port exposure hole 33a, which is shaped like an elongated hole, is formed on the front cover 30 in correspondence to the guide part 50 of the main casing 10, so that the front ports 40 can be exposed to the outside through the front cover 30 and allow a user to arbitrarily dispose the front port unit 60 within the guide part 50 as desired. Herein, the front cover 30 can be provided with at least one exposure hole cover 36a detachably combined (attached or coupled) to the front cover 30 and partially covering the front port exposure hole 33a. Thus, the front port exposure hole 33a can be covered with the exposure hole covers 36a except for an area exposing the front port unit 60 to the outside of the main body 1, thereby providing neatness to the outer appearance of the main body 1.

Further, in the foregoing embodiments, the guide part 50 and the front port unit 60 are provided in the front panel 11 of the main casing 10, thereby exposing the front ports 40 to the outside in a frontal direction of the main body 1. However, the guide part 50 and the front port unit 60 may be provided in a side wall of the supporting frame 15 of the main casing 10, thereby exposing the front port unit 60 to the outside in a lateral direction of the main body 1.

Further, in the foregoing embodiments, the front port unit 60 comprises the cable through hole 65 which is formed throughout the front sliding part 61, the rear sliding part 62, and the connection part 63. However, a cable through hole may be formed on only the front sliding part 61 excluding the rear sliding part 62 and the connection part 63. In this case, the front port cables 41 come out of the front ports 40 toward the inside of the main casing 10 through the cable through hole only formed on the front sliding part 61.

Further, in the foregoing embodiments, the guide part 50 is elongated from the lower part of the front panel 11 to the upper part thereof. However, the guide part 50 may be elongated from the lower part of the front panel 11 to a position thereof corresponding to the drive exposure hole 32.

As described above, there is provided the front port unit 60 comprising the front ports 40 and sliding up and down in the main body 1, so that a position of the front ports 40 provided in the main body 1 and exposed to the outside can be changed. More particularly, the present invention provides a computer system in which a front port unit comprising a front port can slide up and down in a main body, so that a position of the front port on the main body can be changed as desired. Therefore, the present invention provides a computer main casing with a movable port. In particular, a guide part shaped like an elongated hole is formed along a direction, vertically or horizontally, (i.e., along a wall or side of the main casing) on the main casing and a port unit with at least one port slidingly engages the guide part, thereby allowing arbitrary positioning of the ports on the main casing. External devices can be connected to the ports of the port unit. Further, according to the present invention, two or more moveable port units can be provided on a computer casing.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer system comprising:
   a main casing, having a guide part shaped like an elongated hole through a side of the main casing, and formed along an up and down direction in the main casing; and
   a port unit, provided with a port to which an external device is connected, and sliding along the guide part.

2. The computer system according to claim 1, wherein the port unit comprises:
   a front sliding part facing an outer surface of the main casing;
   a rear sliding part facing an inner surface of the main casing; and
   a connection part connecting the front sliding part and the rear sliding part and passing through the guide part to slide along the guide part.

3. The computer system according to claim 2, wherein the guide part and the front port unit are provided on a front of the main casing.

4. The computer system according to claim 2, further comprising a cover coupled to the main casing and formed with a port exposure hole unit exposing the port to the outside.

5. The computer system according to claim 4, wherein the port exposure hole unit comprises an upper exposure hole provided in an upper part of the cover, and a lower exposure hole provided in a lower part of the cover.

6. The computer system according to claim 4, wherein the port exposure hole unit is shaped like an elongated hole and provided along a sliding direction of the port unit.

7. The computer system according to clam 6, further comprising at least one exposure hole cover detachably coupled to the cover and partially covering the port exposure hole unit.

8. The computer system according to claim 1, further comprising a friction member interposed between the main casing and the port unit, and controlling sliding of the port unit along the guide part.

9. The computer system according to claim 8, wherein the friction member is a flat spring.

10. The computer system according to claim 1, wherein the port unit comprises a cable through hole through which a cable from the port passes to inside of the main casing.

11. The computer system according to claim 2, wherein the front and rear sliding parts of the port unit are larger than the guide part in width, thereby allowing the port unit to securely and slidingly engage the guide part.

12. The computer system of claim 2, further comprising a junction protector protecting a junction between the port and a port cable extending from the port towards inside of the main casing.

13. The computer system of claim 12, wherein the junction protector is a cable through hole formed throughout the front sliding part, the connection part and the rear sliding part, and the port cable passes through the cable through hole towards the inside of the main casing.

14. The computer system of claim 12, wherein the junction protector is a cable through hole formed on the front sliding part, and the port cable passes through the cable through hole and the guide part towards the inside of the main casing.

15. A computer system comprising:

a main casing with a movable port unit movable between first and second positions on the main casing; and a guide part shaped like an elongated hole and formed along a wall of the main casing and the port unit with at least one port slidingly engaging the guide part, thereby allowing arbitrary positioning of the at least one port on the main casing.

16. A computer main casing, comprising:

a wall having an elongated hole along a direction of the wall; and a port unit with at least one port slidingly engaging the wall along the elongated hole.

17. A port unit for a computer main casing, the port unit comprising:

a front sliding part to face an outer surface of a wall of the main casing;

at least one exposed port positioned on the front sliding part;

a rear sliding part to face an inner surface of the wall the main casing; and a connection part connecting the front sliding part to the rear sliding part, the connection part to be received in an elongated hole formed on the wall of the main casing to slidingly engage the elongated hole.

* * * * *

UNITED STATES PATENT AND TRADEMARK OFFICE
CERTIFICATE OF CORRECTION

PATENT NO. : 6,920,040 B2
DATED : July 19, 2005
INVENTOR(S) : Hyeng-kyun Kim

It is certified that error appears in the above-identified patent and that said Letters Patent is hereby corrected as shown below:

<u>Column 6,</u>
Line 55, change "clam" to -- claim --.

<u>Column 8,</u>
Line 15, after "wall" insert -- of --.

Signed and Sealed this

Twenty-eighth Day of March, 2006

JON W. DUDAS
*Director of the United States Patent and Trademark Office*